United States Patent
Gliniecki et al.

(10) Patent No.: US 7,346,933 B2
(45) Date of Patent: Mar. 18, 2008

(54) ULTRASONIC SENSOR COMPONENT SIGNAL COMMUNICATION TO STANDALONE UNIVERSAL SERIAL BUS KEYBOARD EMULATOR FOR ENTRY/EXIT COMPUTER PROXIMITY DETERMINATION

(75) Inventors: Gregory James Gliniecki, Cary, IL (US); Mark Thomas Elliott, Elgin, IL (US)

(73) Assignee: ComputerProx Corporation, Elgin, IL (US)

( * ) Notice: Subject to any disclaimer, the term of this patent is extended or adjusted under 35 U.S.C. 154(b) by 771 days.

(21) Appl. No.: 10/219,651

(22) Filed: Aug. 15, 2002

(65) Prior Publication Data

US 2003/0046588 A1 Mar. 6, 2003

Related U.S. Application Data

(60) Provisional application No. 60/317,357, filed on Sep. 5, 2001.

(51) Int. Cl.
*G06F 1/26* (2006.01)
(52) U.S. Cl. .................. 726/34; 340/287; 340/288; 340/289; 340/290; 340/291; 726/19
(58) Field of Classification Search ................ 345/168; 726/34; 713/182
See application file for complete search history.

(56) References Cited

U.S. PATENT DOCUMENTS 5,281,961 A 1/1994 Elwell (Continued)

FOREIGN PATENT DOCUMENTS

GB 2345178 6/2000

OTHER PUBLICATIONS

Namita Ahuja, Robert Mitchell, Karl Schrader, Michael Perry, and Joe Ha; "An Ambient-Light-Ignoring Infrared Active Motion Detector"; EE 498 Final Project Proposal; Feb. 11, 2002, 6 pgs.; Dept. of Electrical Engineering, University of Washington, 253 EE/CSE Bldg., Campus Box 352500, Seattle, WA 98195; www.ee.washington.edu/conselec/Sp96/projects/mitchro/proposal.ht.

(Continued)

*Primary Examiner*—Kambiz Zand
*Assistant Examiner*—Roderick Tolentino
(74) *Attorney, Agent, or Firm*—Wood, Phillips, Katz, Clark & Mortimer; Robert J. Brill

(57) ABSTRACT

A device in one example comprises a standalone universal serial bus keyboard emulator and an ultrasonic sensor component. The standalone universal serial bus keyboard emulator is coupled with a computer through a universal serial bus port. The ultrasonic sensor component is coupled with the standalone universal serial bus keyboard emulator. The ultrasonic sensor component communicates one or more signals to the standalone universal serial bus keyboard emulator that serve to allow the standalone universal serial bus keyboard emulator to make a determination of entry to or exit from a predetermined proximity of the computer by a user. The determination of entry to or exit from the predetermined proximity of the computer by the user causes the standalone universal serial bus keyboard emulator to send a corresponding entrance or exit user configurable keystroke sequence to the computer through the universal serial bus port.

20 Claims, 3 Drawing Sheets

U.S. PATENT DOCUMENTS

| | | | | |
|---|---|---|---|---|
| 5,946,469 | A | * | 8/1999 | Chidester ..................... 703/24 |
| 6,002,427 | A | | 12/1999 | Kipust |
| 6,282,655 | B1 | * | 8/2001 | Given ......................... 726/34 |
| 6,340,116 | B1 | * | 1/2002 | Cecil et al. ................. 235/492 |
| 6,374,145 | B1 | * | 4/2002 | Lignoul ....................... 700/17 |
| 6,594,615 | B2 | * | 7/2003 | Bernard et al. ............. 702/150 |
| 6,823,188 | B1 | * | 11/2004 | Stern ....................... 455/456.1 |

OTHER PUBLICATIONS

"Time-out"; www.dictionary.com/search?q=timeout; Lexico, LLC; Lexico, LLC, 13428 Maxella Avenue #236, Marina del Rey, CA 90292; 2 pgs.; Mar. 18, 2002.

"ComputerProx Allows Users to Walk Away from Security Issues; i-Street Newsletter"; http://www.i-street.com/news/letterView.asp?ID=306; 1 pg.; Aug. 8, 2002.

"Protection for Your Windows PC"; http://nwfusion.com/newsletter/nt/2002/01400846.html; Network World, Inc., 118 Turnpike Road, Southborough, MA 01772-9108; 2 pgs.; Aug. 8, 2002.

"ComputerProx Announces First of its Kind "Walk Away" Technology for Securing Workstations and Desktops"; http://www.computerprox.com/press_two.htm; ComputerProx Corp., 163 E. Chicago Street, 2nd Floor, Elgin, IL 60120; 2 pgs.; Jul. 22, 2002.

"Ultrasonic Sensor for Hands-Free Computer Locking"; http://www.computerprox.com/products.htm; ComputerProx Corp., 163 E. Chicago Street, 2nd Floor, Elgin, IL 60120; 2 pgs.; Jul. 22, 2002.

* cited by examiner

US 7,346,933 B2

ULTRASONIC SENSOR COMPONENT SIGNAL COMMUNICATION TO STANDALONE UNIVERSAL SERIAL BUS KEYBOARD EMULATOR FOR ENTRY/EXIT COMPUTER PROXIMITY DETERMINATION

CROSS-REFERENCE TO RELATED APPLICATION

This application claims the priority of U.S. provisional patent application Ser. No. 60/317,357 (by Gliniecki, et al., filed Sep. 5, 2001, and entitled "SENSOR FOR DETECTING PROXIMITY OF A PERSON TO A COMPUTER FOR SECURITY, POWER SAVINGS AND OTHER FUNCTIONS").

DETAILED DESCRIPTION

Introduction

Figure 3:
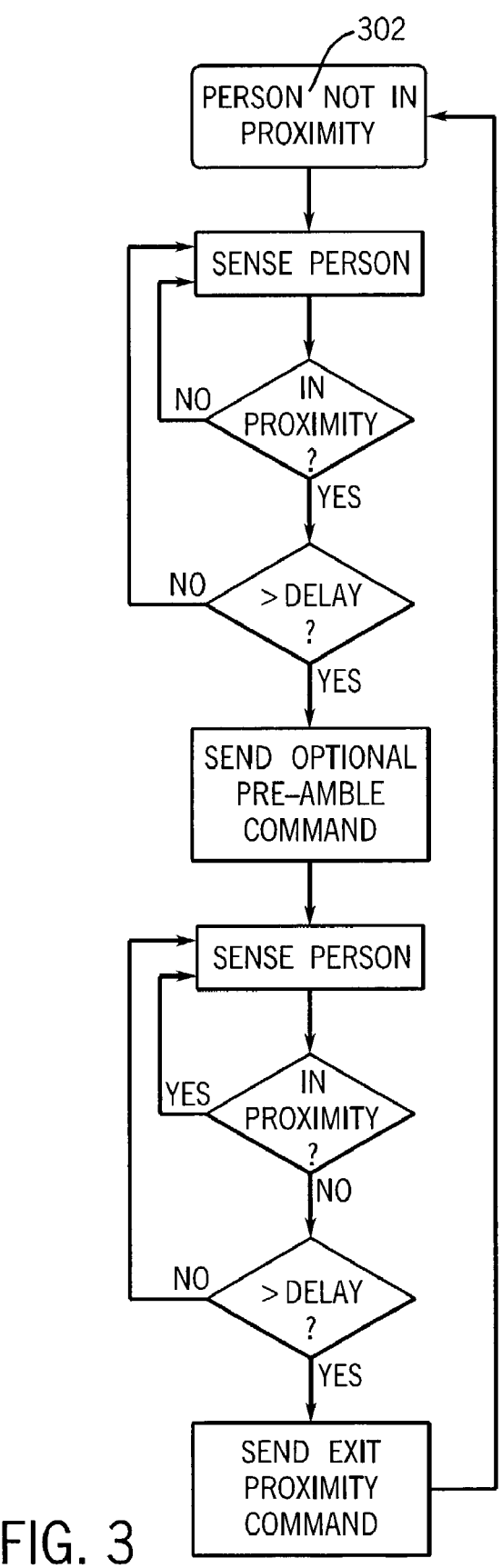
FIG. 3 is a representation of exemplary logic employable by one or more portions of the system of FIG. 1.

Most computer security methods focus on the authentication of a user 302 (FIG. 3) to the computer 102 (the term "computer" in this document refers to personal computers, workstations, terminals, thin clients, point of sale systems or any device requiring a means of user authentication). Common systems include passwords, tokens, smart cards, biometrics, proximity cards and so on. While these devices do provide a means of authentication to the computer 102, they lack the ability to easily detect when the user 302 has left the proximity of the now open computer 102, thus relying on the individual to remember to manually lock the computer 102 by using the keyboard 104 or mouse, or automatically perform the lock after an elapsed timeout. Both of these methods are not an effective means to assure the computer 102 has been locked as soon as the user 302 leaves the proximity.

The proposed device 105 detects the user's 302 proximity to the computer 102 by using ultrasound and/or infrared sensors 106. If the user 302 leaves the proximity, the device 105 detects this event through the use of the sensor(s) 106 and sends a command 120 to lock the computer 102, thus assuring the system 100 is secure.

Furthermore, this same device 105 can also be used as an effective means of putting the system 100 into a standby mode to save power. In today's world of ever rising power costs and shortages, this device 105 can save money and provide a responsible means of saving energy.

Overview

The proposed device 105 uses a sensor 106 to determine when a user 302 is in the proximity of the computer 102. As the user 302 approaches the computer 102 the sensor 106 determines when the user 302 has entered the predetermined proximity and an "armed" state is set. This range of proximity is adjustable by the user 302 for the specific application. Once the user 302 has armed the device 105, the device 105 is ready to send the specific command 120 when the user 302 exits the defined proximity. The "exit command" 120 for example could be the command to lock, logoff or place the computer 102 in standby mode. The exit command 120 can be configured for the specific computer operating system, application program, or desired function.

The device 105 can be designed to attach to a variety of computer ports 124. For modern computer systems 100, the device 105 takes advantage of the computer Universal Serial Bus ("USB"). One example of the port 124 comprises Universal Serial Bus port 126. By using this port 126, the device 105 can emulate a keyboard 104 and thus send the lock or standby command 120 to the computer 102 without any additional application software. These can be the specific key sequences that the user 302 would strike if locking the computer 102 manually. Once the device 105 has been attached to the system 100 as a keyboard 104, the computer 102 thinks the user 302 has typed the commands 120.

Figure 1:
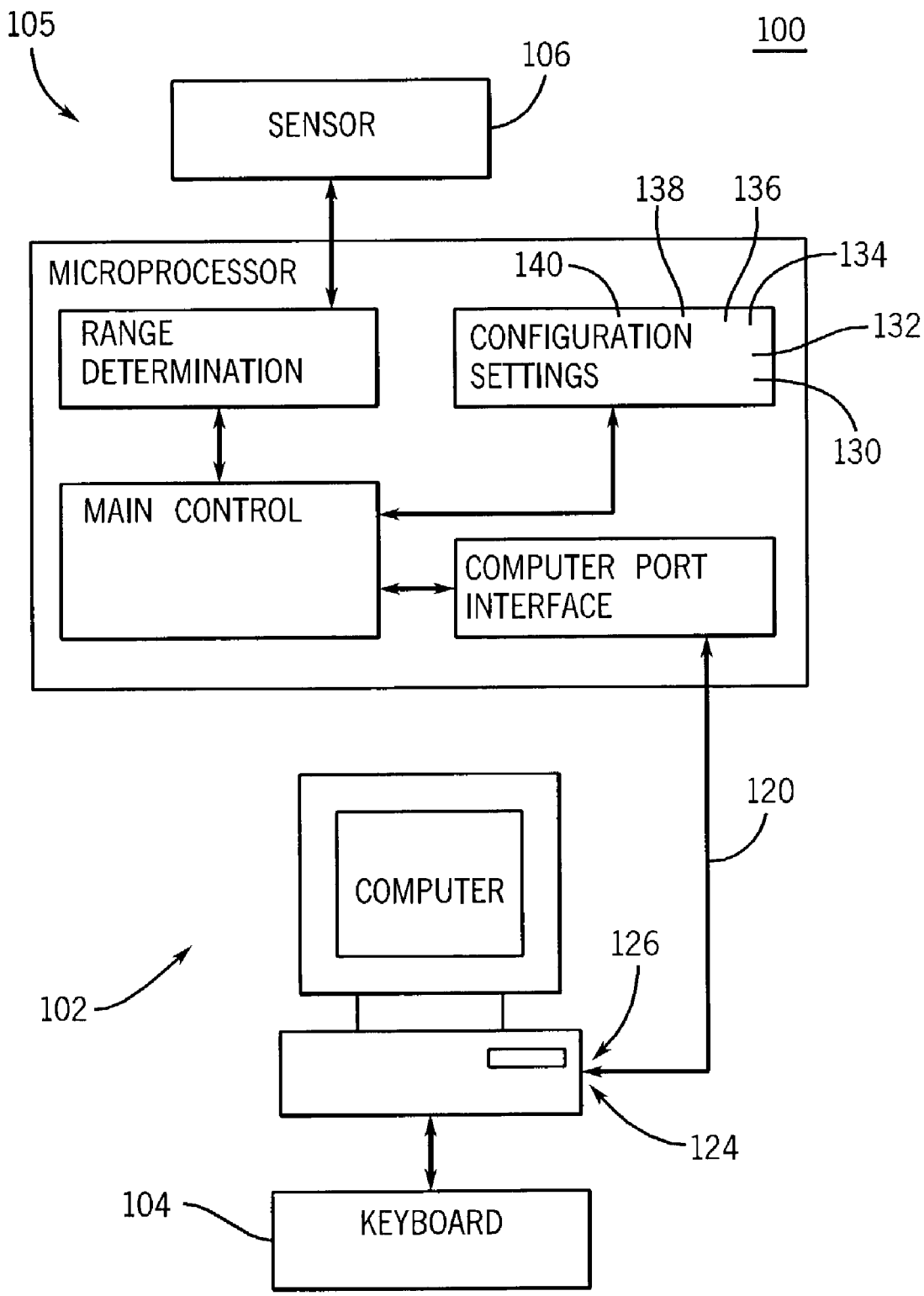
FIG. 1 is a representation of one exemplary implementation of a system.
Figure 2:
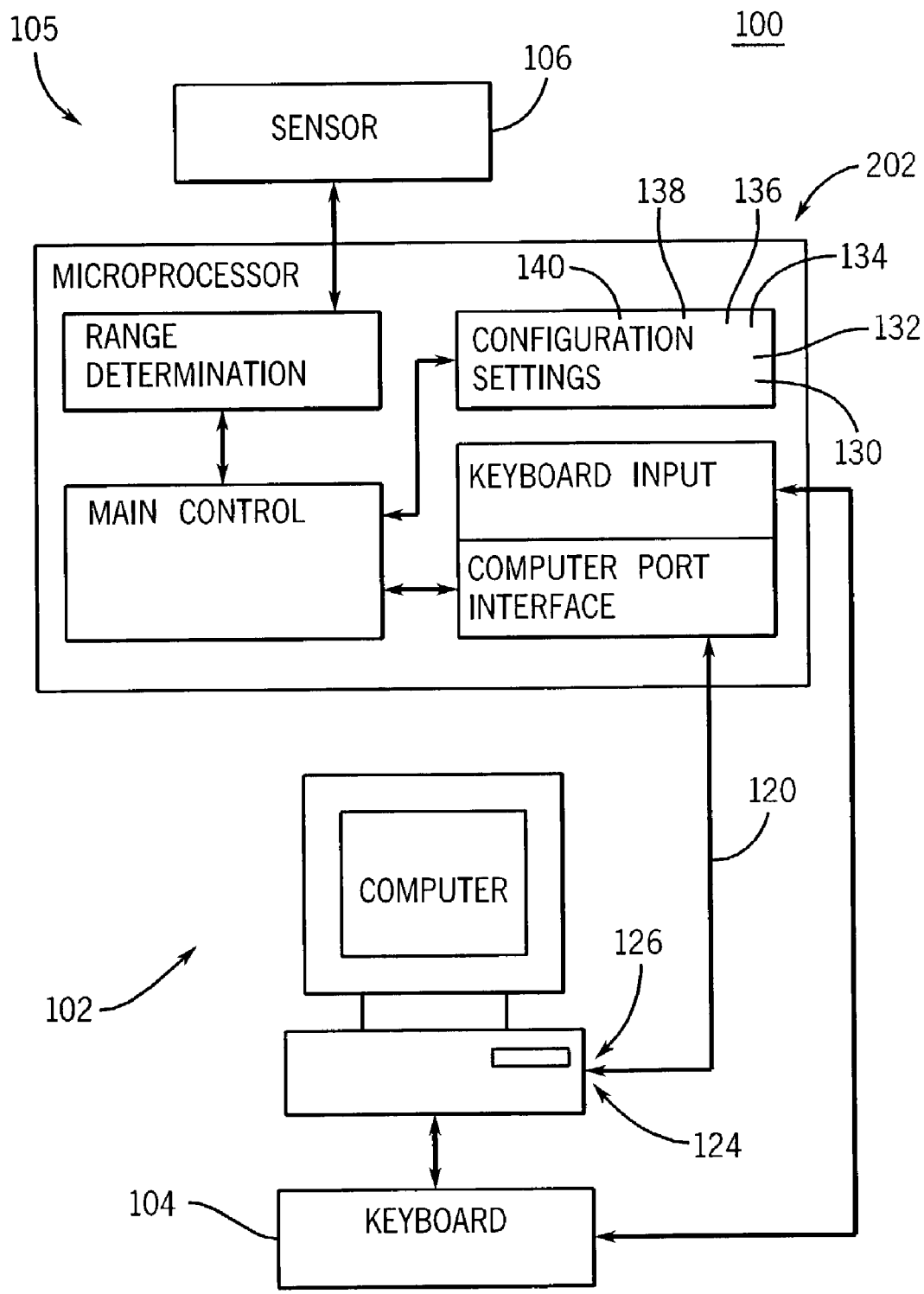
FIG. 2 is a representation of another exemplary implementation of the system of FIG. 1.

For non-USB enabled computers 102, a version of the device 105 can perform a similar emulation by attaching between the keyboard port and computer 102, as a "keyboard wedge" 202 (FIG. 2). In this keyboard wedge configuration, the computer 102 reacts to the device 105 as a keyboard and the exit command 120 can also be sent directly without additional software. Keystrokes manually entered on the keyboard 104 are passed through the device 105.

Optionally the serial, parallel, keyboard, USB or other commonly used ports 124 can be used in conjunction with an installed software application that can act on the device commands 120 to lock, logoff, place the computer 102 in standby mode or any desired function.

Sensing the User 302

A few sensors 106 are currently available for the detection of the user 302. The device 105 can use one or more of the sensing technologies in the design. Ultrasound, active infrared and passive infrared are good choices. These can be used alone or in combination.

Ultrasound Sensor 106

Ultrasound is a good choice due to the fact that a very specific distance can be set by the user 302. An ultrasound transducer continuously sends pulses of ultrasound toward the user space. When the user 302 enters this range, the ultrasound transponder receives the reflection from the user's body. The time between the ultrasound pulse and received reflection is used to calculate the accurate distance of the user 302. When the user 302 has come within a preset range, an "armed" state is set indicating that once the user 302 has left the defined proximity, the device 105 is to send the appropriate exit command 120 to the computer 102.

Infrared Sensor 106

Infrared ("IR") can be used by sensing the intensity of the IR reflected by the user's body. This reflected IR is used to determine the proximity. While generally less accurate in detecting exact distance, the IR sensor 106 is a low cost alternative. When the user 302 leaves the defined proximity, the device 105 can send the appropriate exit command 120.

Passive Infrared ("PIR")

A Passive Infrared ("PIR") sensor 106 can be used to detect body heat. When the user 302 leaves the proximity, the device 105 can send the appropriate exit command 120.

Exit Command 120

The exit command 120 can be at the machine, operating system or application level. An example at the operating system level would be under Microsoft's Windows 2000. After the armed state has been set and the user 302 exits the defined proximity, the Ctl-Alt-Del "k" command can be sent to lock the operating system. Additional keys can be sent to assure that the computer 102 goes back to a passive state in the event the exit commands 120 are sent when the operating system is already locked. (i.e., for Windows 2000 the backspace and escape keys are sent) to reset to the passive locked state.

At the application level, the device 105 can send the appropriate commands 120 that the application requires to lock, log off, go into standby mode, or any other desired function.

Helper Application

A helper application can also be used to send the appropriate commands 120 to the operating system or application. This helper application can be useful when using non-keyboard ports 124 or complex locking, log off, standby sequences or other functions. For example, if the device 105 is attached to the serial port, the application can respond to a command on the serial port and execute the appropriate exit command 120.

This device 105 is also an ideal addition to a Single Sign On ("SSO") solution used on computers 102. The device 105 can send the appropriate lock or log off command 120 to the SSO application to assure the computer 102 is secure when the user 302 leaves the proximity of the computer 102.

Configuration

The device 105 can be configured for the appropriate commands 120 and timings 130 for the walk to ("arm") and walk away ("exit") events.

An arming timeout 132 can be configured to require a pre-determined time before the arm event occurs. A pre-arm key sequence 134 can be sent by the device 105 as well. For example, the Ctl-Alt-Del sequence can be sent when the user 302 walks to a Windows 2000 system so that the computer 102 is ready to accept the user name and password without the user 302 having to hit the Ctl-Alt-Del keystrokes, thus saving user keystrokes.

A delay 136 can be configured to allow the user 302 a predetermined time to be out of the field before triggering the exit command 120. This will help reduce unintentional exit commands 120 if the user 302 is momentarily out of the defined proximity (i.e., reaching for the phone, a folder, etc.).

The sensitivity can be set for proximity distance. This would be the distance of the user 302 when using ultrasound, intensity of reflected IR with the active IR sensor 106, and the intensity of the body heat when using passive IR sensors 106. The defined proximity 138 for arming and the defined proximity 140 for the exit command can be the same or could also be set at different distances based on user preference.

The actual commands 120 can also be configured in the device 105 so that the appropriate pre-arm and exit commands 120 can be configured by the user 302. With the USB and keyboard versions, this can be the actual keystrokes to send the computer 102.

What is claimed is:

1. A universal serial bus (USB) device, consists of:
   a USB processor component that comprises a USB keyboard emulator and a configuration settings component; and
   an ultrasonic sensor component;
   wherein the ultrasonic sensor component is coupled with the USB keyboard emulator within the USB device;
   wherein the USB keyboard emulator is coupled with a computer through a USB port;
   wherein the ultrasonic sensor component communicates one or more signals to the USB keyboard emulator within the USB device that serve to allow the USB keyboard emulator to make a determination within the USB device of entry to or exit from a predetermined proximity of the computer by a user;
   wherein the determination within the USB device by the USB keyboard emulator of entry to or exit from the predetermined proximity of the computer by the user causes the USB keyboard emulator to send a corresponding entrance or exit user configurable keystroke sequence to the computer through the USB port:
      without reliance on a timer based application that is independent of the USB device; and
      any one of:
         immediately upon the determination within the USB device by the USB keyboard emulator of entry to or exit from the predetermined proximity of the computer by the user; or
         after expiration of a delay set within the USB device by the configuration settings component, wherein the user moves from within the predetermined proximity of the computer to without the predetermined proximity of the computer and stays without the predetermined proximity of the computer at least until the expiration of the delay;
   wherein a receipt by the computer of the exit user configurable keystroke sequence serves to place the computer in a secure state without reliance on a timer based application that is independent of the USB device.

2. The USB device of claim 1, wherein the ultrasonic sensor component communicates within the USB device one or more of the one or more signals to the USB keyboard emulator that serve to allow the USB keyboard emulator to make a determination within the USB device of exit from the predetermined proximity of the computer by the user;
   wherein the determination within the USB device of exit from the predetermined proximity of the computer by the user causes the USB keyboard emulator to send the exit user configurable keystroke sequence to the computer through the USB port:
      without reliance on a timer based application that is independent of the USB device; and
      any one of:
         immediately upon the determination within the USB device by the USB keyboard emulator of exit from the predetermined proximity of the computer by the user; or
         after the expiration of the delay set within the USB device by the configuration settings component;
   wherein the exit user configurable keystroke sequence serves to place the computer in the secure state without reliance on a timer based application that is independent of the USB device.

3. The USB device of claim 2, wherein the exit user configurable keystroke sequence comprises a CTL-ALT-DEL "k" sequence.

4. The USB device of claim 1, wherein the ultrasonic sensor component communicates within the USB device one or more of the one or more signals to the USB keyboard emulator that serve to allow the USB keyboard emulator to make a determination within the USB device of exit from the predetermined proximity of the computer by the user;
   wherein the determination within the USB device by the USB keyboard emulator of exit from the predetermined proximity of the computer by the user causes the USB keyboard emulator to send the exit user configurable keystroke sequence to the computer through the USB port:

without reliance on a timer based application that is independent of the USB device; and any one of:

immediately upon the determination within the USB device by the USB keyboard emulator of exit from the predetermined proximity of the computer by the user; or after the expiration of the delay set within the USB device by the configuration settings component;

wherein the exit user configurable keystroke sequence serves to place the computer in the secure state and one or more of a low-power state and a standby state without reliance on a timer based application that is independent of the USB device.

5. The USB device of claim 1, wherein the ultrasonic sensor component communicates one or more of the one or more signals to the USB keyboard emulator within the USB device that serve to allow the USB keyboard emulator to make a determination within the USB device of entry to the predetermined proximity of the computer by the user;

wherein the determination within the USB device by the USB keyboard emulator of entry to the predetermined proximity of the computer by the user causes the USB keyboard emulator to send the entrance user configurable keystroke sequence to the computer through the USB port:

without reliance on a timer based application that is independent of the USB device; and any one of:

immediately upon the determination by the USB keyboard emulator within the USB device of entry to the predetermined proximity of the computer by the user; or after the expiration of the delay set within the USB device by the configuration settings component;

wherein the entrance user configurable keystroke sequence serves to place the computer in one or more of an active state, a login state and a re-authentication state without reliance on a timer based application that is independent of the USB device.

6. The USB device of claim 1, wherein the ultrasonic sensor component communicates one or more of the one or more signals to the USB keyboard emulator within the USB device that serve to allow the USB keyboard emulator to make a determination within the USB device of entry to the predetermined proximity of the computer by the user;

wherein the determination within the USB device by the USB keyboard emulator of entry to the predetermined proximity of the computer by the user causes the USB keyboard emulator to send the entrance user configurable keystroke sequence to the computer through the USB port:

without reliance on a timer based application that is independent of the USB device; and any one of:

immediately upon the determination by the USB keyboard emulator within the USB device of entry to the predetermined proximity of the computer by the user; or after the expiration of the delay set within the USB device by the configuration settings component;

wherein the entrance user configurable keystroke sequence serves to place the computer in an armed state without reliance on a timer based application that is independent of the USB device, wherein exit by the user from the predetermined proximity of the computer in the armed state will cause the computer to be placed in the secure state.

7. The USB device of claim 1, wherein the delay allows the user a predetermined time to move from within the predetermined proximity of the computer to without the predetermined proximity of the computer and back within the predetermined proximity of the computer without the USB keyboard emulator sending the entrance user configurable keystroke sequence to the computer and without the USB keyboard emulator sending the exit user configurable keystroke sequence to the computer.

8. The USB device of claim 7, wherein the ultrasonic sensor component communicates one or more of the one or more signals to the USB keyboard emulator within the USB device that serve to allow the USB keyboard emulator to make a determination within the USB device of the expiration of the delay;

wherein the determination within the USB device by the USB keyboard emulator of the expiration of the delay causes the USB keyboard emulator to send the exit user configurable keystroke sequence to the computer through the USB port without reliance on a timer based application that is independent of the USB device.

9. The USB device of claim 1, wherein processor component comprises a range determination component, wherein the ultrasonic sensor component and the range determination component serve to allow the user to set a very specific distance as the predetermined proximity to the computer.

10. The USB device of claim 1, wherein the ultrasonic sensor component continuously sends pulses of ultrasound toward a user space to obtain the one or more signals the ultrasonic sensor component communicates to the USB keyboard emulator within the USB device that serve to allow the USB keyboard emulator to make the determination within the USB device of entry to or exit from the predetermined proximity of the computer by the user.

11. The USB device of claim 10, wherein the ultrasonic sensor component receives corresponding reflections, from a body of the user, of the pulses of ultrasound the ultrasonic sensor component continuously sends toward the user space;

wherein the USB keyboard emulator within the USB device employs time between one or more of the pulses and corresponding one or more of the reflections to calculate within the USB device a distance of the user from the ultrasonic sensor component.

12. A method, comprising the steps of:

coupling a universal serial bus USB keyboard emulator of a USB device with a computer through a USB port;

coupling an ultrasonic sensor component of the USB device with the USB keyboard emulator within the USB device;

communicating one or more signals from the ultrasonic sensor component to the USB keyboard emulator within the USB device that allow the USB keyboard emulator to make a determination within the USB device of entry to or exit from a predetermined proximity of the computer by a user; and causing, through employment of the determination within the USB device of entry to or exit from the predetermined proximity of the computer by the user, the USB keyboard emulator to send a corresponding entrance or exit user configurable keystroke sequence to the computer through the USB port:

without reliance on a timer based application that is independent of the USB keyboard emulator and the ultrasonic sensor component; and any one of:

immediately upon the determination within the USB device by the USB keyboard emulator of entry to or exit from the predetermined proximity of the computer by the user; or after expiration of a delay set within the USB device by a configuration settings component of the USB device, wherein the user moves from within the predetermined proximity of the computer to without the predetermined proximity of the computer and stays without the predetermined proximity of the computer at least until the expiration of the delay;

wherein a receipt by the computer of the exit user configurable keystroke sequence serves to place the computer in a secure state without reliance on a timer based application that is independent of the USB keyboard emulator and the ultrasonic sensor component.

13. The method of claim 12, wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

communicating one or more of the one or more signals from the ultrasonic sensor component to the USB keyboard emulator within the USB device that allow the USB keyboard emulator to make a determination within the USB device of exit from the predetermined proximity of the computer by the user;

wherein the step of causing, through employment of the determination within the USB device by the USB keyboard emulator of entry to or exit from the predetermined proximity of the computer by the user, the USB keyboard emulator to send the corresponding entrance or exit user configurable keystroke sequence to the computer through the USB port comprises the step of:

causing, through employment of the determination within the USB device by the USB keyboard emulator of exit from the predetermined proximity of the computer by the user, the USB keyboard emulator to send the exit user configurable keystroke sequence to the computer through the USB port:

without reliance on a timer based application that is independent of the USB keyboard emulator and the ultrasonic sensor component; and any one of:

immediately upon the determination within the USB device by the USB keyboard emulator of exit from the predetermined proximity of the computer by the user; or after the expiration of the delay set within the USB device by the configuration settings component;

the method further comprising the step of:

placing the computer in the secure state through employment of the exit user configurable keystroke sequence without reliance on a timer based application that is independent of the USB device.

14. The method of claim 13, wherein the step of causing, through employment of the determination within the USB device by the USB keyboard emulator of exit from the predetermined proximity of the computer by the user, the USB keyboard emulator to send the exit user configurable keystroke sequence to the computer through the USB port comprises the step of:

selecting the exit user configurable keystroke sequence to comprise a CTL-ALT-DEL "k" sequence.

15. The method of claim 12, wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

communicating one or more of the one or more signals from the ultrasonic sensor component to the USB keyboard emulator within the USB device that allow the USB keyboard emulator to make a determination within the USB device of exit from the predetermined proximity of the computer by the user;

wherein the step of causing, through employment of the determination within the USB device by the USB keyboard emulator of entry to or exit from the predetermined proximity of the computer by the user, the USB keyboard emulator to send the corresponding entrance or exit user configurable keystroke sequence to the computer through the USB port comprises the step of:

causing, through employment of the determination within the USB device by the USB keyboard emulator of exit from the predetermined proximity of the computer by the user, the USB keyboard emulator to send the exit user configurable keystroke sequence to the computer through the USB port:

without reliance on a timer based application that is independent of the USB device; and any one of:

immediately upon the determination within the USB device by the USB keyboard emulator of exit from the predetermined proximity of the computer by the user; or after the expiration of the delay set within the USB device by the configuration settings component;

the method further comprising the step of:

placing the computer in the secure state and one or more of a low-power state and a standby state through employment of the exit user configurable keystroke sequence without reliance on a timer based application that is independent of the USB device.

16. The method of claim 12, wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

communicating one or more of the one or more signals from the ultrasonic sensor component to the USB keyboard emulator within the USB device that allow the USB keyboard emulator to make a determination within the USB device of entry to the predetermined proximity of the computer by the user;

wherein the step of causing, through employment of the determination within the USB device by the USB keyboard emulator of entry to or exit from the predetermined proximity of the computer by the user, the USB keyboard emulator to send the corresponding entrance or exit user configurable keystroke sequence to the computer through the USB port comprises the step of:

causing, through employment of the determination within the USB device by the USB keyboard emulator of entry to the predetermined proximity of the computer by the user, the USB keyboard emulator to send the entrance user configurable keystroke sequence to the computer through the USB port:

without reliance on a timer based application that is independent of the USB device; and any one of:

immediately upon the determination within the USB device by the USB keyboard emulator of entry to the predetermined proximity of the computer by the user; or after the expiration of the delay set within the USB device by the configuration settings component;

the method further comprising the step of:

placing the computer in one or more of an active state, a login state and a re-authentication state through employment of the entrance user configurable keystroke sequence without reliance on a timer based application that is independent of the USB device.

17. The method of claim 12, wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

communicating one or more of the one or more signals from the ultrasonic sensor component to the USB keyboard emulator within the USB device that allow the USB keyboard emulator to make a determination within the USB device of entry to the predetermined proximity of the computer by the user;

wherein the step of causing, through employment of the determination within the USB device by the USB keyboard emulator of entry to or exit from the predetermined proximity of the computer by the user, the USB keyboard emulator to send the corresponding entrance or exit user configurable keystroke sequence to the computer through the USB port comprises the step of:

causing, through employment of the determination within the USB device by the USB keyboard emulator of entry to the predetermined proximity of the computer by the user, the USB keyboard emulator to send the entrance user configurable keystroke sequence to the computer through the USB port:

without reliance on a timer based application that is independent of the USB device; and any one of:

immediately upon the determination within the USB device by the USB keyboard emulator of entry to the predetermined proximity of the computer by the user; or after the expiration of the delay set within the USB device by the configuration settings component;

the method further comprising the step of:

placing, through employment of the entrance user configurable keystroke sequence without reliance on a timer based application that is independent of the USB device, the computer in an armed state, wherein exit by the user from the predetermined proximity of the computer in the armed state will cause the computer to be placed in the secure state.

18. The method of claim 12, wherein the step of coupling the USB keyboard emulator with the computer through the USB port comprises the step of:

selecting the USB device to comprise the configuration settings component;

wherein the step of causing, through employment of the determination within the USB device by the USB keyboard emulator of entry to or exit from the predetermined proximity of the computer by the user, the USB keyboard emulator to send a corresponding entrance or exit user configurable keystroke sequence to the computer through the USB port comprises the step of:

setting the delay within the USB device through employment of the configuration settings component, wherein the delay allows the user a predetermined time to move from within the predetermined proximity of the computer to without the predetermined proximity of the computer and back within the predetermined proximity of the computer without the USB keyboard emulator sending the entrance user configurable keystroke sequence to the computer and without the USB keyboard emulator sending the exit user configurable keystroke sequence to the computer;

wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

communicating one or more of the one or more signals from the ultrasonic sensor component to the USB keyboard emulator within the USB device that serve to allow the USB keyboard emulator to make a determination within the USB device of the expiration of the delay;

wherein the step of causing, through employment of the determination within the USB device by the USB keyboard emulator of entry to or exit from the predetermined proximity of the computer by the user, the USB keyboard emulator to send the corresponding entrance or exit user configurable keystroke sequence to the computer through the USB port comprises the step of:

causing, through employment of the determination within the USB device by the USB keyboard emulator of the expiration of the delay, the USB keyboard emulator to send the exit user configurable keystroke sequence to the computer through the USB port.

19. The method of claim 12, wherein the step of coupling the ultrasonic sensor component with the USB keyboard emulator comprises the step of:

selecting the USB device to comprise a range determination component;

selecting the ultrasonic sensor component and the range determination component to allow the user to set a very specific distance as the predetermined proximity to the computer.

20. The method of claim 12, wherein the step of communicating the one or more signals from the ultrasonic sensor component to the USB keyboard emulator within the USB device that allow the USB keyboard emulator to make the determination within the USB device of entry to or exit from the predetermined proximity of the computer by the user comprises the step of:

continuously sending pulses of ultrasound from the ultrasonic sensor component and toward a user space to obtain the one or more signals communicated from the ultrasonic sensor component to the USB keyboard emulator within the USB device that allow the USB keyboard emulator to make the determination within the USB device of entry to or exit from the predetermined proximity of the computer by the user;

the method further comprising the steps of:

receiving, through employment of the ultrasonic sensor component, corresponding reflections, from a body of the user, of the pulses of ultrasound continuously sent from the ultrasonic sensor component and toward the user space;

employing, within the USB device at the USB keyboard emulator, time between one or more of the pulses and corresponding one or more of the reflections to calculate within the USB device a distance of the user from the ultrasonic sensor component.

\* \* \* \* \*